United States Patent
Wobben

(10) Patent No.: US 7,077,630 B2
(45) Date of Patent: Jul. 18, 2006

(54) LUBRICATION OF A PITCH ANGLE ADJUSTING DEVICE OF A ROTOR BLADE OF A WINDMILL

(76) Inventor: Aloys Wobben, Argestrasse 19, Aurich (DE) 26607

( * ) Notice: Subject to any disclaimer, the term of this patent is extended or adjusted under 35 U.S.C. 154(b) by 175 days.

(21) Appl. No.: 10/487,857

(22) PCT Filed: Aug. 22, 2002

(86) PCT No.: PCT/EP02/09367

§ 371 (c)(1),
(2), (4) Date: Jul. 16, 2004

(87) PCT Pub. No.: WO03/019004

PCT Pub. Date: Mar. 6, 2003

(65) Prior Publication Data

US 2004/0240997 A1    Dec. 2, 2004

(30) Foreign Application Priority Data

Aug. 25, 2001 (DE) ................................ 101 41 667

(51) Int. Cl.
*F04D 29/36* (2006.01)
*F03D 11/04* (2006.01)
(52) U.S. Cl. .................................... 416/155; 416/174
(58) Field of Classification Search ............ 416/146 A, 416/155, 158, 174; 290/44, 55
See application file for complete search history.

(56) References Cited

U.S. PATENT DOCUMENTS

| 3,811,577 | A | 5/1974 | Yancey ........................ 212/69 |
| 5,957,000 | A | 9/1999 | Pecorari ...................... 74/425 |
| 6,774,504 | B1 * | 8/2004 | Lagerwey .................... 290/44 |
| 6,783,326 | B1 * | 8/2004 | Weitkamp et al. ............ 416/1 |
| 6,991,378 | B1 * | 1/2006 | Jacquemont et al. ....... 384/471 |

FOREIGN PATENT DOCUMENTS

| DE | 29 31 348    | 2/1981  |
| DE | 196 34 059 C1 | 10/1997 |
| DE | 200 21 026 U1 | 3/2001  |
| FR | 2 275 704    | 2/1976  |
| JP | 5-196048     | 8/1993  |
| JP | 7-91359      | 4/1995  |
| JP | 2000-110197  | 4/2000  |

* cited by examiner

*Primary Examiner*—Edward K. Look
*Assistant Examiner*—Devin Hanan
(74) *Attorney, Agent, or Firm*—Seed IP Law Group PLLC

(57) ABSTRACT

In accordance with the invention an apparatus for rotating a shaft of a rotor blade of a wind power installation relative to a hub of the wind power installation, comprising a bearing arrangement between the components and a gear drive for actuation of the rotary movement for adjusting the pitch angle of the rotor blade is characterized in that a gear of the drive and the bearing arrangement are arranged in the volume region of a lubricant chamber.

9 Claims, 3 Drawing Sheets

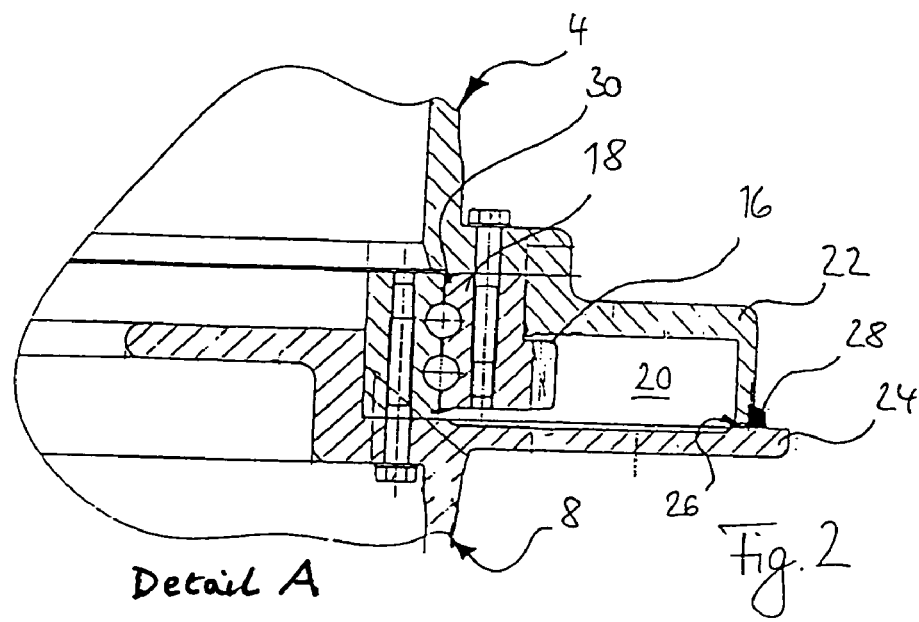
Fig. 2 Detail A
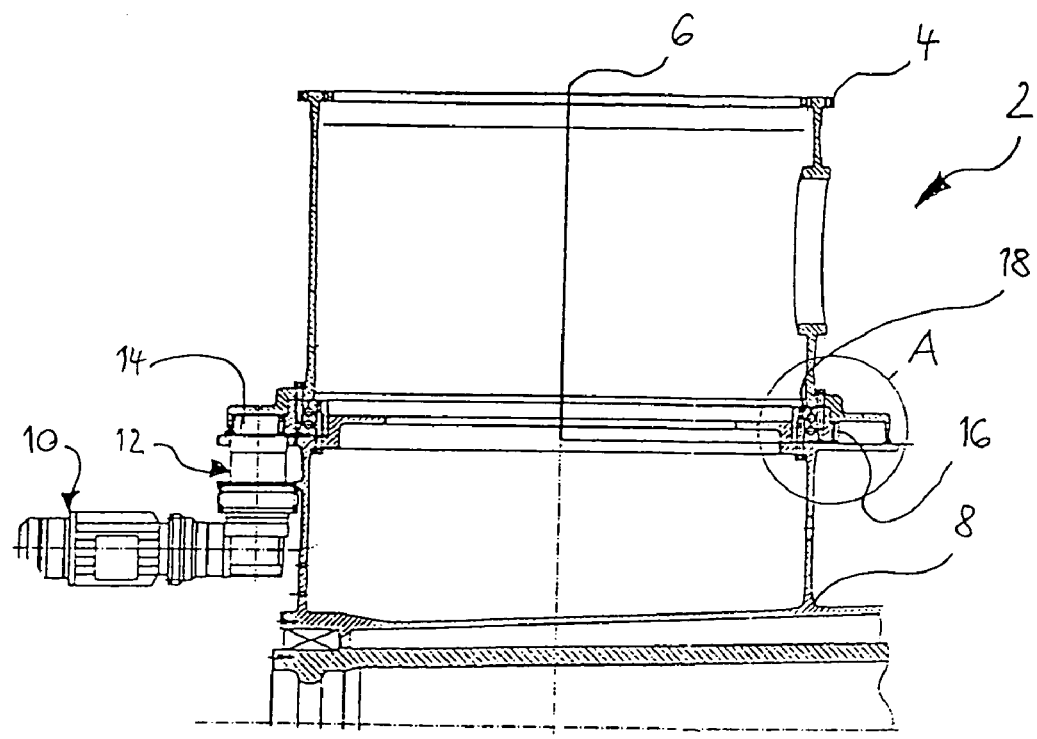
Fig. 1

LUBRICATION OF A PITCH ANGLE ADJUSTING DEVICE OF A ROTOR BLADE OF A WINDMILL

FIELD OF THE INVENTION

The present invention concerns an apparatus for rotating a rotor blade of a wind power installation relative to a hub of the wind power installation, comprising a bearing arrangement between the components and a gear drive for actuation of the rotary movement for adjusting the pitch angle of a rotor blade of a wind power installation.

BACKGROUND OF THE INVENTION

In order for two components to rotate relative to each other, they must be supported rotatably relative to each other, which as is known can be implemented for example by means of a plain bearing arrangement or a rolling bearing arrangement. As is known, lubrication for the bearing arrangement is required in order to minimize wear in the bearing arrangement. In order to actuate the rotary movement between the components, it is also necessary to involve a drive which, as is known, can be embodied for example by a gear transmission. If the gear transmission does not involve plastic gears which can only transmit low levels of torque, lubrication is required in the case of such a transmission in order to reduce wear.

As is known, lubricants are fed to the apparatus to provide the lubricating effect, more specifically either only when constructing the apparatus, this being known as so-called service life lubrication for example for rolling bearings, or at given intervals, which makes a respective maintenance intervention operation necessary, usually carried out by trained personnel.

At this juncture attention is directed generally to the following publications, as state of the art: DE 36 25 840 A1, DE 196 34 059 C1; DE 200 21 026 U1; DE 44 32 986 A1; DE 37 32 730 C1; and DE 44 44 535 A1. The above-indicated publications also inter alia cast light on the technological background of the present invention.

A particular situation of use of an apparatus for rotating two components relative to each other is an apparatus for rotating a rotor blade of a wind power installation about the longitudinal axis of the blade with respect to the rotor hub of the wind power installation for adjusting what is known as the pitch angle, that is to say the angle of incidence of the rotor blade with respect to the wind direction into which the rotor is oriented. Here, forces produced on the rotor blade by the wind exert a flexing moment of considerable magnitude on the bearing arrangement, which also adversely influences the wear aspect when rotary movement occurs. In addition, the rotary drive must produce a high rotating moment, not least because of those considerable flexing moments, and only a comparatively small amount of structural space is available for the rotary drive at the blade root where the bearing arrangement is also disposed. Because of the catastrophic consequences in the event of damage and consequential failure, for example because of excessive wear, the lubrication required both for the bearing arrangement and also for the rotary drive is particularly critical and therefore has to be carefully implemented. However, because of poor accessibility to the region to be lubricated, careful lubrication is also particularly complicated and expensive.

BRIEF SUMMARY OF THE INVENTION

One object of the present invention, in an apparatus for rotating a rotor blade of a wind power installation relative to a hub of the wind power installation, is to improve the lubrication of the bearing arrangement and the drive.

According to the invention that object is attained by an apparatus having the features set forth in claim 1. Preferred configurations of the invention are recited in the appendant claims.

In accordance with the invention, in an apparatus for rotating a first component in relation to a second component, a bearing arrangement between the components and a gear of the drive for the rotary movement are arranged in the volume region of a lubricant chamber. The bearing arrangement to be lubricated and the gear to be lubricated are consequently disposed in closely juxtaposed positional relationship so that a lubricant which is fed to the gear and/or the bearing arrangement is distributed and interchanged between the bearing and the gear. Preferably the lubricant can be fed to the bearing arrangement and is then distributed from there to the gear.

Particularly in the situation where the bearing arrangement and the gear of the apparatus are arranged coaxially and/or substantially in a plane perpendicular to the axis thereof—which is preferably the case for example in an apparatus according to the invention for adjusting the pitch angle at the rotor blade of a wind power installation—the teeth of the gear of the rotary drive and the rolling bodies of the preferred rolling bearing arrangement —in particular a twin-row ball bearing—in the cross-section of the apparatus are so close together, surrounded by a lubricant chamber wall, that lubricant can be distributed through the lubricant chamber from the rolling bodies to the teeth.

BRIEF DESCRIPTION OF THE DRAWINGS

The invention is described by way of example hereinafter with reference to the accompanying drawings.

FIG. 1 is a view in cross-section through an apparatus according to the invention for rotating a rotor blade of a wind power installation with respect to the rotor hub thereof, FIG. 2 is a view in cross-section through the bearing arrangement and the gear of the apparatus of FIG. 1 as a detail from FIG. 1.

DETAILED DESCRIPTION OF THE INVENTION

Figure 3:
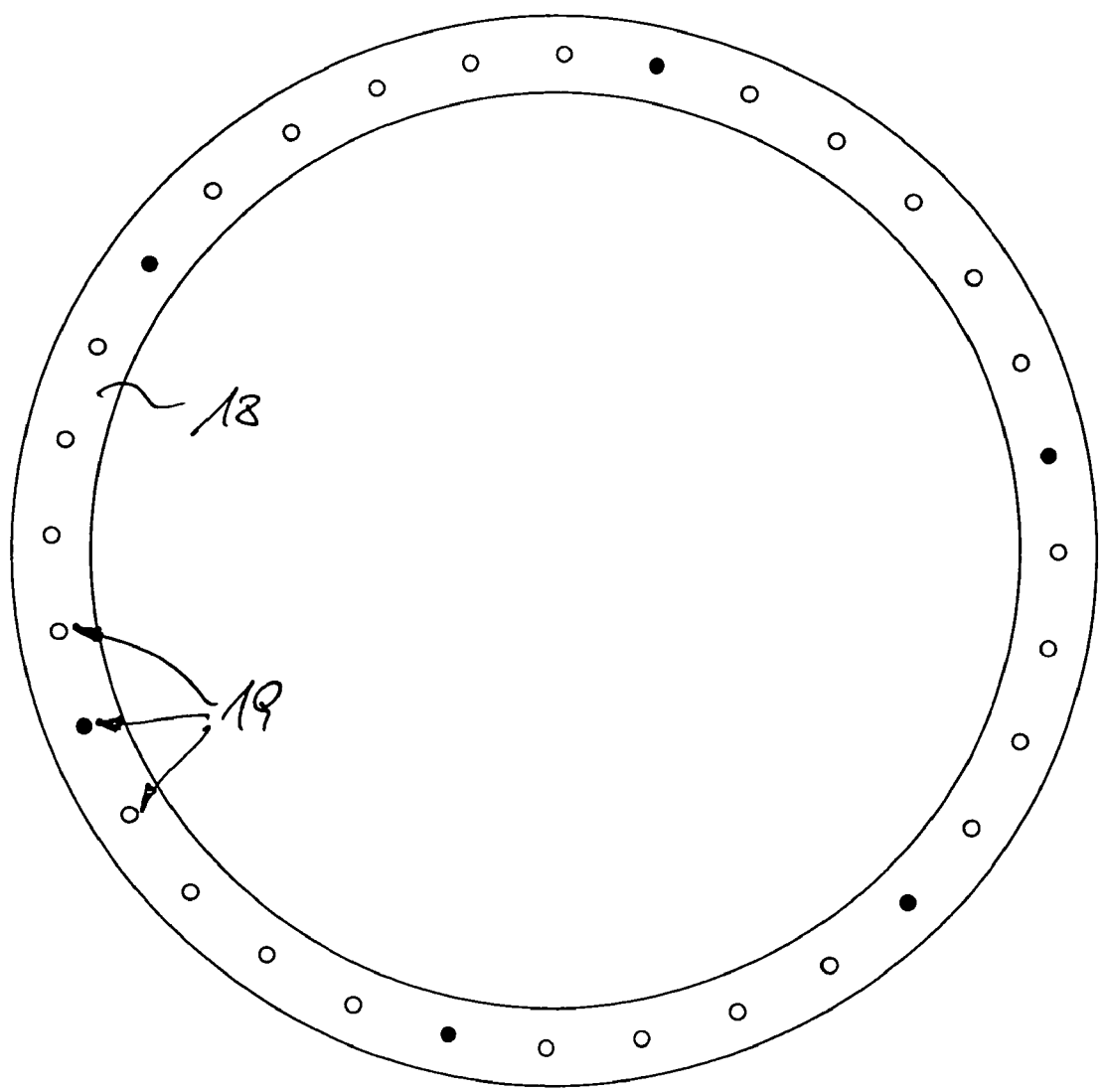
FIG. 3 shows a view on to the underside of a rolling bearing.

FIG. 1 shows an apparatus 2 for rotating the blade root 4 of a rotor blade (not shown) of a wind power installation about the longitudinal axis 6 of the rotor blade with respect to the hub 8 of the wind power installation. It is also possible to see in FIG. 1 in particular an electric motor 10 which actuates the rotary movement by way of a transmission 12. In this arrangement, a pinion 14 of the transmission 12 engages a gear 16 which, looking at FIG. 2, can be better seen in the detail illustrated therein from FIG. 1. The rotational bearing arrangement in the form of a twin-row ball bearing 18 can also be particularly clearly seen in FIG. 2.

Looking at FIGS. 1 and 2, it will also be seen that, as measured at the diameter of the rolling bearing 18 and the gear 16 about the axis 6 (FIG. 1), the spacing between the rolling bodies of the bearing 18 and the teeth of the gear 16 is very small in the cross-sectional view (FIG. 2). In the cross-section shown in FIG. 2 the bearingarrangement 18 and the teeth 16 are disposed in the volume region of a lubricant chamber 20 through which lubricating grease can be distributed from the rolling bodies 18 to the teeth 16 over a short distance and as an adbquate supply of lubricant. The lubricant chamber 20 is therefore a chamber in the form of a circular ring which is coaxial with the bearing 18 and the gear 16 about the axis 6 and which has two radially outer wall regions 22, 24 of which one 22 is fixed to the rotor blade root 4 and one 24 is fixed to the rotor hub 8. The wall regions 22, 24 are separated from each other by a gap 26 which permits the rotary movement of the two wall portions 22, 24 with the rotor blade 4 and the hub 8 and which is sealed off by a sealing ring 28. Radially inwardly the gap between the wall regions 22 and 24 extends with the gap between the rolling bearing shell portions of the rolling bearing 18 and is there sealed off by a rolling bearing seal 30.

FIG. 3 is a simplified view on to the underside of the rolling bearing 18. Bores 19 are arranged in the rolling bearing 18. The majority of those bores 19 are through bores. Some of those bores however are in the form of a blind bore. The rolling bearing is screwed to one of the counterpart bearing components through the through bores while the blind bores which are shown in the form of black-filled circles in FIG. 3 are not provided for fixing to the counterpart bearing component but for feeding the lubricant for the rolling bearing.

Figure 4:
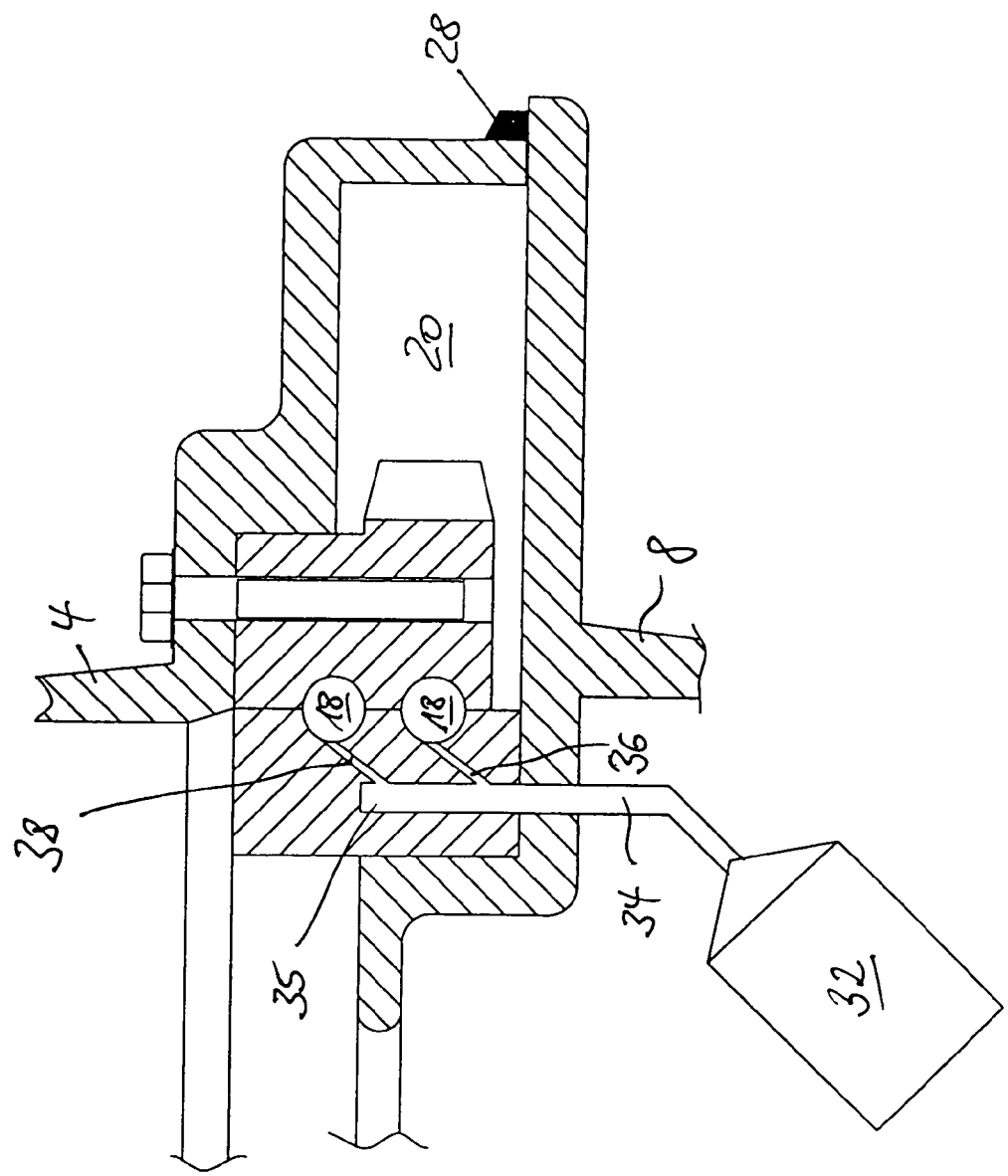
FIG. 4 shows a view in cross-section through the bearings and the gear of a lubricating grease feed arrangement according to the invention.

FIG. 4 shows the hub 8, the blade root and the rolling bearing 18 arranged therebetween. In this Figure the blind bore is denoted by reference 35. In accordance with the invention, a screw is not used here to make a connection between the counterpart bearing components, but a lubricating grease cartridge 32 (lubricant reservoir) is connected to the blind bore 35 by way of a feed duct 34. From the blind bore 35 a first passage 36 and a second passage 38 lead to the rolling bodies which in this Figure are denoted by references 18. The lubricant which is urged under pressure out of the lubricating grease cartridge 32 therefore passes through the feed duct 34 and the blind bore 35 through the passages 36, 38 into the rolling bearing and lubricates it. Due to the fact that the rolling bearing is sealingly fitted to the counterpart bearing components, the lubricating grease which is urged out of the rolling bearing by the grease which is pressed thereinto. by the follow-on feed of grease into the bearing can only escape to the underside of the rolling bearing into the lubricant chamber 20. There, that grease is still used to lubricate the pitch drive.

As can be seen from FIG. 3, such blind bores are distributed over the periphery of the rolling bearing. This provides that the rolling bearing 18 contains fresh lubricating grease at those six locations which are distributed over its periphery, and that the old lubricating grease issues outwardly into the lubricant chamber at for example those six peripherally distributed positions. That provides for lubrication for the blade adjusting drive over the entire periphery thereof.

As will be clearly apparent from FIGS. 3 and 4 of the description, the lubricant chamber 20 is not for example a lubricant bath which provides lubrication for the blade adjusting drive on the one hand and the rolling bearing on the other hand, but rather the fresh lubricating grease is firstly fed to the rolling bearing 18 and, when it issues there, it is still used to lubricate the blade adjusting drive. An oppositely directed flow of lubricant could transport particles from the blade adjusting drive into the rolling bearing and thus give rise to damage to the rolling bearing, which is absolutely to be avoided. This means that the path of the lubricating agent is in one direction in the sense of a 'one-way street' which is only from the rolling bearing into the lubricant chamber 20 but is not returned.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An apparatus for rotating a rotor blade of a wind power installation relative to a hub of the wind power installation, comprising:
   a bearing arrangement between the rotor blade and the hub;
   a gear drive having gears for actuation of the rotary movement for adjusting the pitch angle of the rotor blade;
   a lubricant chamber having at least one gear therein; and
   a lubricant feed channel coupled to the bearing arrangement and to the lubricant chamber such that lubricant is provided to the lubricant chamber through the bearing arrangement.

2. The apparatus according to claim 1 characterised in that the bearing arrangement and the gear are arranged coaxially.

3. The apparatus according to claim 1, characterised in that the bearing arrangement and the gear are arranged substantially in a plane perpendicular to the axis thereof.

4. The apparatus according to claim 1, characterised in that the bearing arrangement is a rolling bearing.

5. The apparatus according to claim 1 characterised in that the bearing arrangement is a twin-row ball bearing.

6. The apparatus according to claim 1 characterised by a lubricant feed through the bearing.

7. The apparatus according to claim 1 characterised in that there is provided a lubricant reservoir which communicates with the bearing by way of a feed duct.

8. The apparatus according to claim 7 characterised in that unused lubricant is firstly fed from the lubricant reservoir to the bearing and after use can be fed from the bearing to the lubricant chamber.

9. The apparatus according to claim 8 characterised in that the feed of lubricant from the lubricant chamber back to the bearing arrangement is not possible.

* * * * *